United States Patent
Gobina et al.

(10) Patent No.: US 7,641,888 B2
(45) Date of Patent: Jan. 5, 2010

(54) MEMBRANE APPARATUS AND METHOD OF PREPARING A MEMBRANE AND A METHOD OF PRODUCING HYDROGEN

(75) Inventors: Edward Gobina, Aberdeen (GB); Susanne Olsen, Aberdeen (GB)

(73) Assignee: Gas2 Limited, Aberdeen (GB)

( * ) Notice: Subject to any disclaimer, the term of this patent is extended or adjusted under 35 U.S.C. 154(b) by 690 days.

(21) Appl. No.: 10/555,000

(22) PCT Filed: Apr. 28, 2004

(86) PCT No.: PCT/GB2004/001787
§ 371 (c)(1), (2), (4) Date: Oct. 31, 2005

(87) PCT Pub. No.: WO2004/098750
PCT Pub. Date: Nov. 18, 2004

(65) Prior Publication Data
US 2006/0239874 A1 Oct. 26, 2006

(30) Foreign Application Priority Data
May 3, 2003 (GB) .................. 0310281.1

(51) Int. Cl.
*C01B 3/02* (2006.01)
(52) U.S. Cl. .................. 423/648.1; 423/650; 423/652
(58) Field of Classification Search .................. 423/650
See application file for complete search history.

(56) References Cited

U.S. PATENT DOCUMENTS 5,510,056 A * 4/1996 Jacobs et al. ................. 252/373
5,569,633 A * 10/1996 Carolan et al. ................. 502/4
5,846,641 A 12/1998 Zhou et al.

(Continued)

FOREIGN PATENT DOCUMENTS

EP 0663232 A2 7/1995

(Continued)

*Primary Examiner*—Melvin C Mayes
*Assistant Examiner*—Kenneth Vaden
(74) *Attorney, Agent, or Firm*—Womble Carlyle Sandridge & Rice, PLLC; Mark D. Jenkins

(57) ABSTRACT

The present invention discloses a method, apparatus and method of manufacturing an apparatus; all to produce hydrogen gas, particularly synthesis gas. Preferred embodiments of the invention include an alpha alumina membrane which has been treated with a $TiO_2$ wash coat on one side and has an active gamma alumina layer on an opposite side. A metal catalyst, preferably rhodium, is deposited within the pores of the alumina. Oxygen travels through the membrane and is activated before contacting methane on the other side of the membrane and forming synthesis gas through partial oxidation of the methane. Embodiments of the invention have a number of benefits including the high conversion rate of oxygen (100%), the separate feed streams of methane and oxygen which allow for optimal ratios to be used without danger of explosion, and the opportunity to vary the feed rates without changing the products formed. Normally gaseous hydrocarbons recovered from remote oil wells (e.g. offshore oil wells) can thus be converted to synthesis gas and then to normally liquid hydrocarbons via a Fischer-Tropsch type reaction. The normally liquid hydrocarbons are easier to transport away from the remote oil well than normally gaseous hydrocarbons.

10 Claims, 15 Drawing Sheets

U.S. PATENT DOCUMENTS

| | | |
|---|---|---|
| 5,980,840 A | 11/1999 | Kobylinski et al. |
| 6,114,399 A * | 9/2000 | Roberts et al. ............... 518/710 |
| 6,187,465 B1 * | 2/2001 | Galloway .................... 429/17 |
| 6,368,383 B1 * | 4/2002 | Virkar et al. .................... 95/54 |
| 6,399,540 B1 * | 6/2002 | Oki et al. .................... 502/350 |
| 6,488,907 B1 * | 12/2002 | Barnes et al. ............ 423/418.2 |
| 7,229,537 B2 | 3/2005 | Chen et al. |
| 2002/0022568 A1 | 2/2002 | Mackay et al. |
| 2003/0218991 A1 * | 11/2003 | Besecker et al. ............ 370/286 |

FOREIGN PATENT DOCUMENTS

| | | |
|---|---|---|
| WO | WO 01/93987 A | 12/2001 |
| WO | WO 03/099424 A | 12/2003 |

* cited by examiner

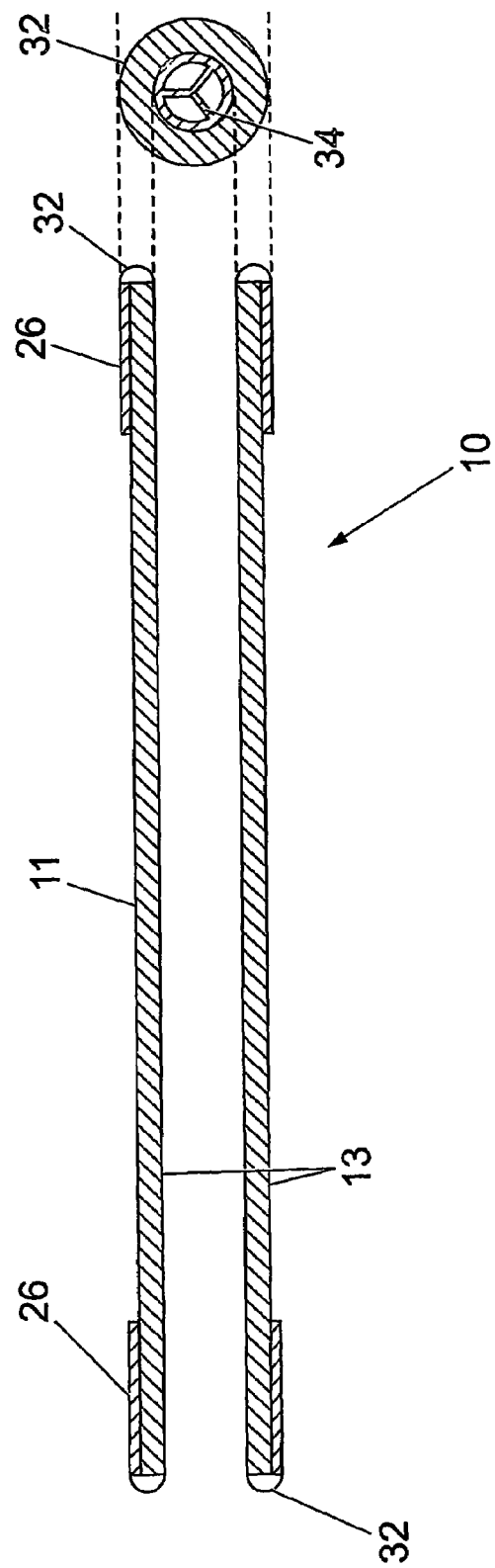

MEMBRANE APPARATUS AND METHOD OF PREPARING A MEMBRANE AND A METHOD OF PRODUCING HYDROGEN

The present invention relates to a membrane and a method of preparing the membrane, the membrane being particularly, but not exclusively, useful in producing synthetic gas for use in Fischer-Tropsch gas-to-liquids production in the oil and gas exploration industry or for producing hydrogen for use as a fuel.

While offshore oil production has risen slightly in recent years, natural gas (which mainly consists of methane) production has seen a marked increase. Natural gas is often extracted during the extraction of liquid hydrocarbons, such as oil, from the ground and is often undesirable due to the lack of infrastructure to transport the natural gas to an onshore location. The lack of infrastructure can be explained by the physical nature of natural gas which makes it difficult to transport safely and/or efficiently in its basic gaseous state. As a result the natural gas is often flared (ignited) causing economic waste and environmental concern. It would therefore be desirable to either convert the natural gas into some other substance which can be transported easily, or transport the natural gas in a liquid state. In this way, new field development will be more financially viable through the use of the extensive infrastructure and technology already in place in the offshore industry for transporting liquid hydrocarbons.

It is known to transport natural gas as a Liquid Natural Gas (LNG) in specifically constructed containers onboard vessels which have been adapted for such purposes. However, this has many disadvantages including; the need for expensive pressurising equipment which is difficult to scale down to suit smaller production fields, loss of gas during transportation ("boil-off"), danger posed in transit to vessel and crew by high pressure, highly flammable gases and the requirement to depressurise the LNG into a usable gaseous state at the customer end.

It is considered that a better way of utilising offshore produced natural gas (CH4) is to convert it, on or in close proximity to the offshore production platform, into synthetic gas (syngas) which can in turn be used to produce gases, fluids and chemicals such as methanol, ammonia and importantly, crude oil that can be readily pumped through the same pipelines as the produced oil. Syngas comprises a mixture of carbon monoxide(CO) and hydrogen ($H_2$).

By way of background information to the reader, conversion of syngas to liquid hydrocarbon is a chain growth reaction between carbon monoxide and hydrogen on the surface of a heterogeneous catalyst. The catalyst is either iron or cobalt based and the reaction is highly exothermic. The temperature, pressure, and catalyst determine whether a light or heavy syncrude is produced. For example at 330° C. mostly gasoline and olefins are produced whereas at 180° C. to 250° C. mostly diesel and waxes are produced. There are two main types of Fischer-Tropsch reactors. The vertical fixed tube type has the catalyst in tubes that are cooled externally by pressurised boiling water. In large plants, several reactors arranged in parallel may be used, presenting energy savings. Another process uses a slurry reactor in which pre-heated syngas is fed into the bottom of the reactor and distributed into the slurry which consists of liquid wax and catalyst particles. As the syngas bubbles upwards through the slurry, it is diffused and converted into more wax by the Fischer-Tropsch reaction. The heat generated is removed through the reactors cooling coils where steam is generated for use in the process. Again by way of background information to the reader, this is shown in FIG. 7.

Thus if methane (or other gaseous hydrocarbons) could be converted to syngas and thereafter to liquid hydrocarbons, the transportation costs and difficulties outlined above would be mitigated.

Synthesis gas can be made by partial oxidation of methane (although it is more usually made by the reaction of methane with steam under pressure.)

A major safety problem with the partial oxidation of methane arises because methane and air (or oxygen) should be fed into the reactor at the same time and therefore there is the danger of an explosion.

It is known in the art that a reactor with relatively dense ceramic membranes that conduct oxygen can be used for syngas production (e.g. WO 98/48921 and WO 01/93987). These membranes generate syngas by avoiding direct contact between the oxygen and hydrocarbon feed, but this necessitates the use of very high temperatures in order to achieve the necessary oxygen flux. Moreover, being dense means that the membrane has to be as thin as possible, resulting in brittleness and crack formation, loss of efficiency and reduced operating service life. In some cases the membrane would need to be so thin that it would be unable to support its own weight and therefore impossible to use in practice.

Cost effective natural gas (methane) conversion to syngas for gas-to-liquids production would therefore be an important commercial development.

Hydrogen can be used as a clean fuel. However, the amount of hydrogen that can be produced by using renewable natural energy sources such as solar, wind, and hydro-power is currently not sufficient to satisfy demand. The utilisation of natural gas and/or the production of hydrogen from natural gas seen to be a viable alternative and the most realistic solution at least in the first half of this century [1, 2].

An example of progress in the widespread utilisation of natural gas involves the development of small co-generation system using the micro-gas turbine. In addition, fuel cells are expected to be a highly-efficient power generating system. The fuel cells are anticipated to be deployed in residences in addition to the installation in electrical vehicles. Home-use of fuel cells can provide hot-water and electricity, simultaneously. To commercialise the stationary fuel cells, it is necessary to establish alternative hydrogen generation technology.

According to a first aspect of the present invention there is provided an apparatus comprising a first chamber and a second chamber and a membrane which divides the first and second chambers; the membrane comprising an inorganic support and a catalyst; the membrane being adapted to allow passage of a first reactant from the first chamber to the second chamber through said membrane;

wherein the first reactant is imparted with enough energy by the catalyst upon said passage so as to react with the second reactant.

According to a second aspect of the present invention there is provided a method of preparing a membrane, the method comprising:

providing a support; and adding a catalyst to the support.

Preferably the first reactant is activated by being imparted with enough energy by the catalyst upon said passage so as to react with the second reactant.

Preferably the energy imparted on the first reactant activates molecules of the first reactant without forming an ionic species, such as $O^{2-}$.

Preferably the support is adapted to operate at temperatures exceeding 250° C.

Preferably the support comprises an inorganic support.

Preferably, the membrane initially comprises an inorganic coarse porous support. Most preferably, the membrane initially comprises a ceramic coarse porous support such as alpha alumina.

Preferably, the first coating alters the said surface of the support and more preferably, the first coating roughens the said surface.

Preferably, the first coating selectively alters the size, and more preferably, the diameter and tortuosity of the pores. Preferably, the first coating is applied by dipping the support into a solution which may comprise a wash coat solution such as a retracting metal oxide solution. In a preferred embodiment, the wash coat solution comprises Titanium Dioxide ($TiO_2$). Typically, the first coating is applied to an outer surface which may be an outer cylindrical surface of the support.

Typically, the method further includes the step of applying a second coating to a second surface of the support, said second surface preferably being an inner surface of the support and more preferably being an inner surface of a bore of the support. The second coating preferably comprises a flux control layer and more preferably the second coating is an inorganic porous layer. Most preferably, the second coating comprises a gamma alumina layer. Preferably, the second coating is applied by dipping the support into a solution which may comprise a boehmite solution.

Typically, the method further includes the steps of drying the support and heating/firing the support. Typically, the dipping-drying-firing sequence of the second coating may be repeated a number of times as required.

Preferably, the method further includes the step of applying a catalyst to a surface of the membrane. Typically, the catalyst is applied to the inner bore of the pores of the membrane. Typically, the catalyst comprises a metallic or non-metallic catalyst, and is more preferably a metallic active catalyst. Most preferably, the catalyst comprises active rhodium. Alternatively the catalyst can comprise nickel. Preferably, the catalyst is applied to the said surface by passing an osmotic solution over the said first surface, which may be a first side, of the membrane and a cationic or anionic catalyst precursor solution over the said second surface, which may be the other side of the membrane, such that the catalyst is deposited on the inner bore of the membrane pores. Preferably, the osmotic solution comprises different electrolytes and non-electrolytes in an aqueous solution at room temperature. More preferably, the osmotic solution comprises a sucrose solution.

Preferably, the method further includes the step of heating the membrane to a relatively high temperature and may include the further step of passing Hydrogen through the membrane pores such that calcination occurs.

Preferably, the support may comprise one or more inner structures such as struts to increase the surface area of the inner surface of the inner bore.

According to a third aspect of the present invention there is provided a method of producing hydrogen gas, the method comprising:

providing a membrane, the membrane comprising a support and a catalyst;

passing a first reactant through the membrane from a first chamber to a second chamber; allowing the first reactant to come into contact with the catalyst upon passage through said membrane;

imparting the first reactant with enough energy so as to react with the second reactant; reacting the first reactant with a second reactant to produce hydrogen gas.

Preferably, the membrane comprises a substantially annular cylinder and more preferably, the first and second chambers comprise a substantially cylindrical cross section. More preferably, a sidewall of the membrane separates the first and second chambers and the second cylindrical chamber may be located within the first cylindrical chamber.

Preferably, the second cylindrical chamber is defined by an inner bore of the membrane.

Preferably, a portion of the membrane is permeable. Alternatively, the entire membrane is permeable.

Preferably, the first reactant passes from the first chamber through pores formed in the sidewall of the membrane to the second chamber.

Alternatively, the second reactant passes from the second chamber through the membrane to the first chamber.

Preferably, the first reactant is oxygen and the second reactant is a hydrocarbon. More preferably the second reactant is methane. Typically, the synthetic gas comprises carbon monoxide and hydrogen.

An embodiment of the present invention will now be described, by way of example only, with reference to the accompanying drawings in which:

FIG. 2A is a transverse cross sectional view showing the support of FIG. 1 in more detail;

FIG. 2B is an end view of the support of FIG. 2A showing 'O' rings and cross sectional shape of the support;

Figure 1:
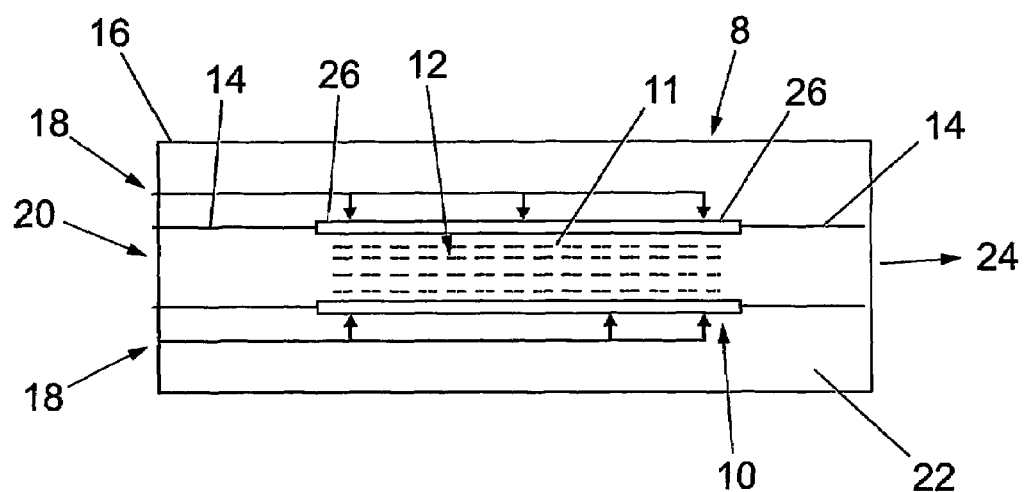
FIG. 1 is a transverse cross sectional schematic view of a support of a membrane apparatus in accordance with the present invention.

A membrane apparatus 8 in accordance with the present invention is shown in FIG. 1 and comprises a tubular membrane 10 and an outer tubular shell 16. Two gas flow passages are thus formed which are substantially sealed off from each other. The first within a bore 14 of the membrane 10 and the second in the annulus 22 between the membrane 10 and the shell 16.

The inner bore 14 of the modified membrane 10 may have some supporting struts 34, as shown in FIG. 2. These increase the structural strength of the modified membrane 10. In operation, the struts 34 also change the flow pattern of oxygen flowing through the sidewall 13 of the membrane 10 by reducing the opportunity for the methane flowing through the inner bore 14 to pass directly through the centre of the modified membrane 10 inner bore without coming into contact with the modified membrane 10 surface. The struts 34 also increase the internal surface area per unit volume of the modified membrane 10, and hence increase the opportunity for activation, compared to a completely hollow cross section.

Referring to FIGS. 2A, 2B and 3a-3b the preparation of the membrane 10 layers will now be described.

The process starts with the inorganic (preferably ceramic) coarse porous support 10. Supports of this nature are now widely available and a wide variety of companies currently supply these base materials and a preferred support 10 comprises an alpha-alumina tube having 10 mm outer diameter and a 7 mm inner diameter, typically having a pore size of between 110 and 180 nm. The support 10 comprises a porous middle portion 11 which is typically around 300 mm in length, and two remaining non-porous portions 26 of about 25 mm in length at each end of the membrane 10. The end portions 26 are made non-porous by glazing them with a sealant, such as $SiO_2$—$BaO$—$CaO$ at 1100° C.

The wash coat 28 is then applied to the outer cylindrical surface of the support 10 by dipping the support 10 into a substance such as $TiO_2$. This wash coat 28 dipping step roughens the outer cylindrical surface of the support 10 and adds microporosity to the walls of the membrane catalysts 12. (In operation the rough surface of the wash coat 28 forces the oxygen particles (not shown) to convolute around the raggedness of the wash coat 12 and serves to improve mass transfer of the limiting reactant (oxygen) to the catalytic sites—this results in improved syngas yields).

The oxygen flux control layer 30 is then applied to the inside surface of the inner bore 14 of the support 10. This layer 30 should be inorganic to enable operation of the membrane 10 at high temperatures and may comprise a gamma alumina layer derived from a boehmite(AlO(OH)) solution with a concentration of 0.6 mol/L. The inner surface of the support 10 is exposed to the boehmite solution via dipping for about 2 minutes. The support is then air-dried overnight and then heated to between 700-750° C. at a rate of 1° C./min. It may be necessary to repeat this dipping-drying-firing sequence for up to a total of three cycles to achieve the required gamma-alumina layer thickness on the support 10.

The deposition of the catalysts 12 on the support 10 is achieved using an osmotic ionic exchange process, which will now be described.

Figure 3A:
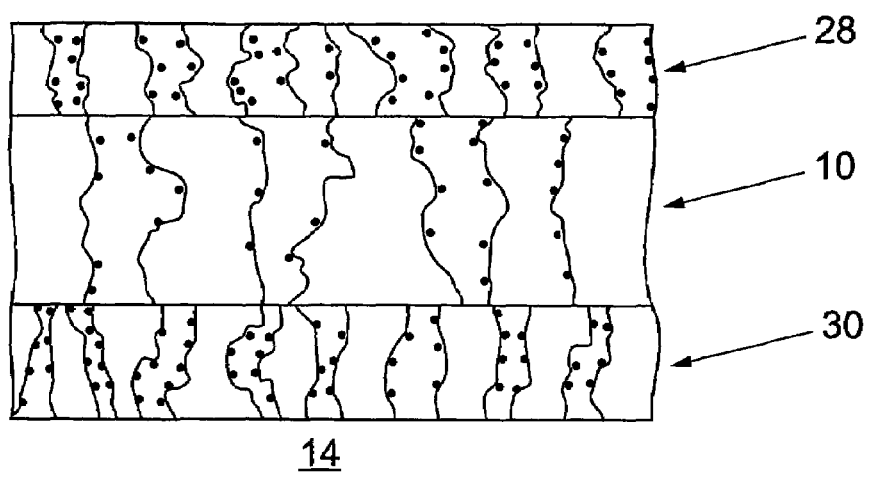
FIG. 3a is a diagrammatic cross sectional view showing the formation of layers in the membrane of the membrane apparatus of FIGS. 2A and 2B.
Figure 3B:
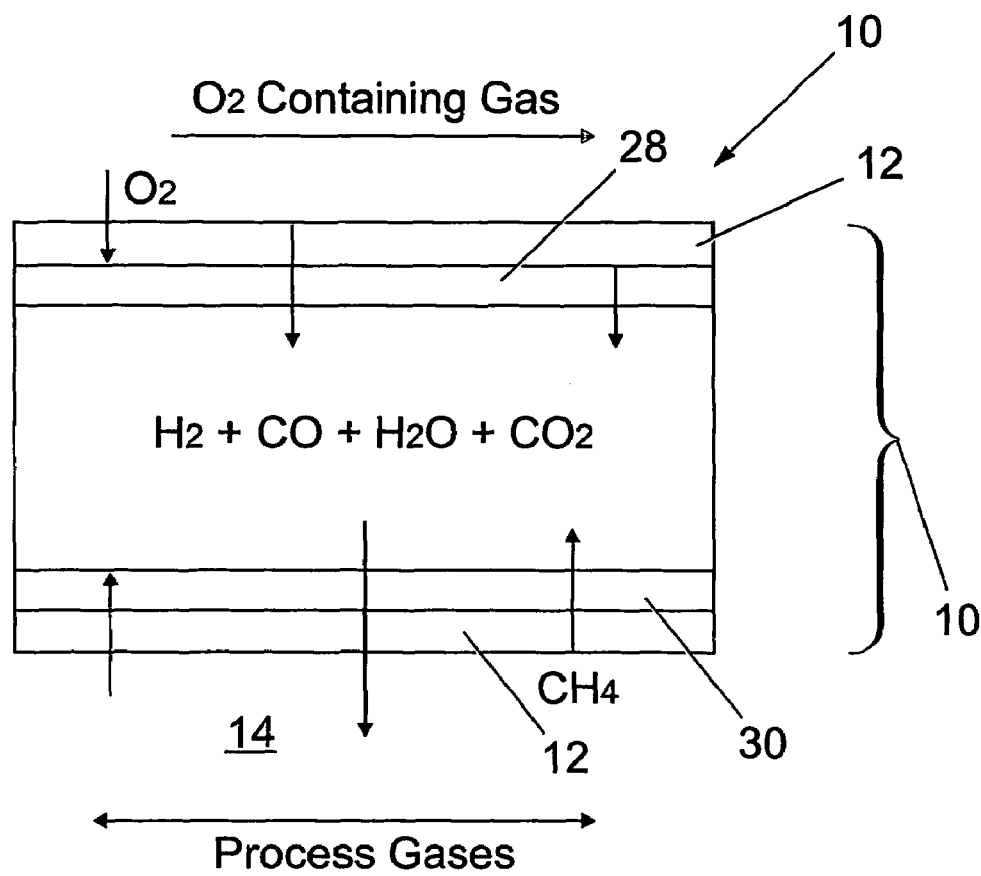
FIG. 3b is a further diagrammatic cross sectional view of the membrane apparatus.

Osmotic Ionic Exchanged Catalyst Deposition:

The catalysts 12 are prepared using either cationic or anionic exchange using RhNO3 or RhCl3.2H2O respectively in an organic medium (0.2 g/L) as precursors. Owing to the asymmetrical character of the membrane as shown in FIG. 3a (i.e. wash coat 28+support 10+gamma alumina layer (boehmite) 30) different ways of introducing the catalysts 12 to the support 10 are utilised. In the first instance, the osmosis process involves immersing the outer surface of the partially modified membrane 10 in 6.0 molar sucrose solution, while the catalyst precursor solution (e.g. $RhNO_3$ or $RhCl_3.2H_2O$) is circulated through the inner bore 14 of the partially modified membrane 10. This configuration is reversed in the second instance with the immersion of the outer surface of the partially modified membrane 10 now in a catalyst precursor solution and the osmotic (sucrose) solution now circulated in the inner bore 14 of the partially modified membrane 10. The membrane 10 is then washed using distilled water and subsequently dried by blowing dry air either through the inner bore of the now modified membrane 10 or across the outer cylindrical surface.

Calcination (which involves heating the modified membrane 10 to a very high temperature and then passing Hydrogen through the modified membrane 10) is then carried out under atmospheric pressure at 400° C. for 2 hours. Metallic (active) Rh (the catalyst 12) is obtained by reduction of Rhodium ionic species using hydrogen at 400° C. for 2 hours.

The modified membrane 10 characteristics may now be measured. This may be done by scanning electron microscopy (SEM) to show the degree of filling of the modified membrane 10 pore network and to estimate the gamma alumina (boehmite) layer 30 thickness.

Alternative materials may be selected. However it is important that the selected materials have similar thermal coefficients of expansion as adjacent layers. If there is difference in thermal expansion coefficients of the active porous layers and porous support layers, there is an advantage in selecting materials for the intermediate porous support layers, with expansion coefficients which gradually change from values near those for the active porous layer to values near those for the outer porous support layer. One way of achieving this is to prepare the intermediate layers from a mixture of the material used in forming active porous layer decreasing in successive porous support layers. For instance, porous support layer could contain 75% by weight of the material used in forming the active porous layer.

The above discussion does not exclude the use of identical materials in active porous layer and porous support layer. Such a material selection will eliminate chemical incompatibility and differential thermal expansion problems but typically entails sacrifices in strength and material cost.

The number of porous support layers will depend on the porous radius of the adjacent active porous layer. They will vary from a single layer for active porous layer pore radii selected from the upper end of the specified range to four for pore radii selected from the lower end of the specified range.

The surface area of a material determines many of its physical and chemical properties, including water retention capacity and reactivity with nutrients and contaminants. The BET Surface Area Analyser can be used to estimate the specific external surface of a solid by determining the volume of a specific gas that is absorbed under controlled conditions. The BET surface Area Analyser has typically been used in routine characterisation of various membrane materials and synthetic mineral analogues important in process engineering systems.

In the context of the present invention, BET surface area analysis using nitrogen adsorption is used to estimate the pore size distribution in the modified membrane 10 and also to indicate values of porosity and pore volume. Energy Dispersive X-Ray Analysis (EDXA) surface analysis of the modified membrane 10 is used to confirm whether or not the modified membrane 10 forms a continuous gamma alumina network and the extent of any defects. It also provides elemental composition of the catalysts 12 and its relative dispersion. X-ray Photoelectron Spectroscopy (XPS) is then used for chemical analysis of the modified membrane 10.

It is recognised that the partial oxidation of methane may occur via two distinct mechanisms, i.e. direct partial oxidation or total oxidation followed by reforming reactions.

To convert methane to syngas a partial oxidation is required.

$$CH_4 + O_2 \rightarrow CO + H_2$$

Should a full oxidation occur, the reaction products would be $CO_2$ and $H_2O$.

The operation of the modified membrane 10 in the membrane apparatus 8 will now be described.

An oxygen ($O_2$) supply 18 is fed into the outer bore 22 at one end of the membrane apparatus 8, and a natural gas (which mainly comprises methane ($CH_4$)) supply 20 is fed into the corresponding end of the inner bore 14.

The partial pressure of the oxygen 18 is maintained at a higher pressure than that of the methane supply 20, which results in the oxygen passing through the pores (not shown) of the modified membrane 10 from the outer bore 22 to the inner bore 14. Upon doing so, the oxygen molecules come into contact with the catalysts 12 present in the sidewall 13 of the modified membrane 10, which activates the oxygen molecules before contacting the methane present in the inner bore of the modified membrane 10. This activation imparts sufficient energy on the $O_2$ molecule so that it can react at relatively low temperatures without forming an oxygen ion.

When the activated oxygen molecules come into contact with the methane molecules, syngas is instantly formed according to the following chemical reaction:

$$CH_4 + O_2{}^* \Rightarrow_{catalyst} CO + H_2.$$

The produced syngas exits the membrane apparatus 8 from the other end of the inner bore 14 due to the natural pressure differential created by the methane supply 20, such that a syngas flow 24 is created. Pneumatic control of the oxygen supply 18 flow rate allows different flow rates of the methane supply 20 to be used, since an increase in the pressure of the oxygen supply will result in a greater flux of oxygen through the pores of the modified membrane 10.

In use a gas stream comprising the methane flows next to or through the catalyst impregnated layer 12. The gamma alumina layer 30 on the bore side 14 enhances the reaction between permeated oxygen and the methane. Since the oxygen molecules have to diffuse to the bore side 14 of the gamma alumina layer 30 and the adjacent porous layer, the gaseous environment of the gamma alumina layer 30 at and near the bore is less reducing than in the outer porous layers. As a result a complete or partial oxidation reaction will take place here with some reforming occurring as gas moves away from the gamma alumina layer 30 respectively. It is advantageous to coat pores of the last porous support layer with the reforming catalyst such as Rh to induce some endothermic reforming as combustion products flow through the porous support layer. This will assist in removing the heat of the exothermic oxidation reaction from the surface of the active porous layer.

The gradient in oxygen activity in the porous layer will prevent damage to the gamma alumina layer 30 from exposure to very low oxygen partial pressures, thus permitting a greater degree of freedom in the selection of materials for these layers.

Gas permeability through the modified membrane 10 can be measured by placing the end of the modified membrane 10 sample tightly against the ends of the outer tubular shell 16, with a seal being formed therebetween by 'O' rings 32. A gas connection (not shown) of the outer tubular shell 16 is attached to a source of constant pressure. The predetermined pressure difference being used creates a stable flow of gas through the sidewall 13 of the membrane 10 sample, and is used to measure the flow rate, which is proportional to the gas permeability of the modified membrane 10.

Multi-component selectivity can be obtained by measuring the individual species concentration in the feed and permeate respectively.

Analysis of the reactants and products are analysed using gas chromatography (GC) on-line using a 5 m ⅛ inch molecular sieve column to determine methane, $O_2$, $H_2$ and CO. Any $CO_2$ will be analysed using a separate 2 m long column of Porapak® QS. In this analysis, a thermal conductivity detector is also used. Water formed during the reaction is condensed in an ice trap and further removed by using a Drierite® trap.

In order to calibrate the chromatograph, multi-component gas mixtures consisting of certified compositions of methane, hydrogen, carbon dioxide, carbon monoxide and oxygen were fed on one side of the modified membrane 10 (e.g. the outer bore 22) and the streams entering and exiting the inner bore 14 were analysed using the Thermal Conductivity Detector (TCD) of a gas chromatograph.

Figure 4:
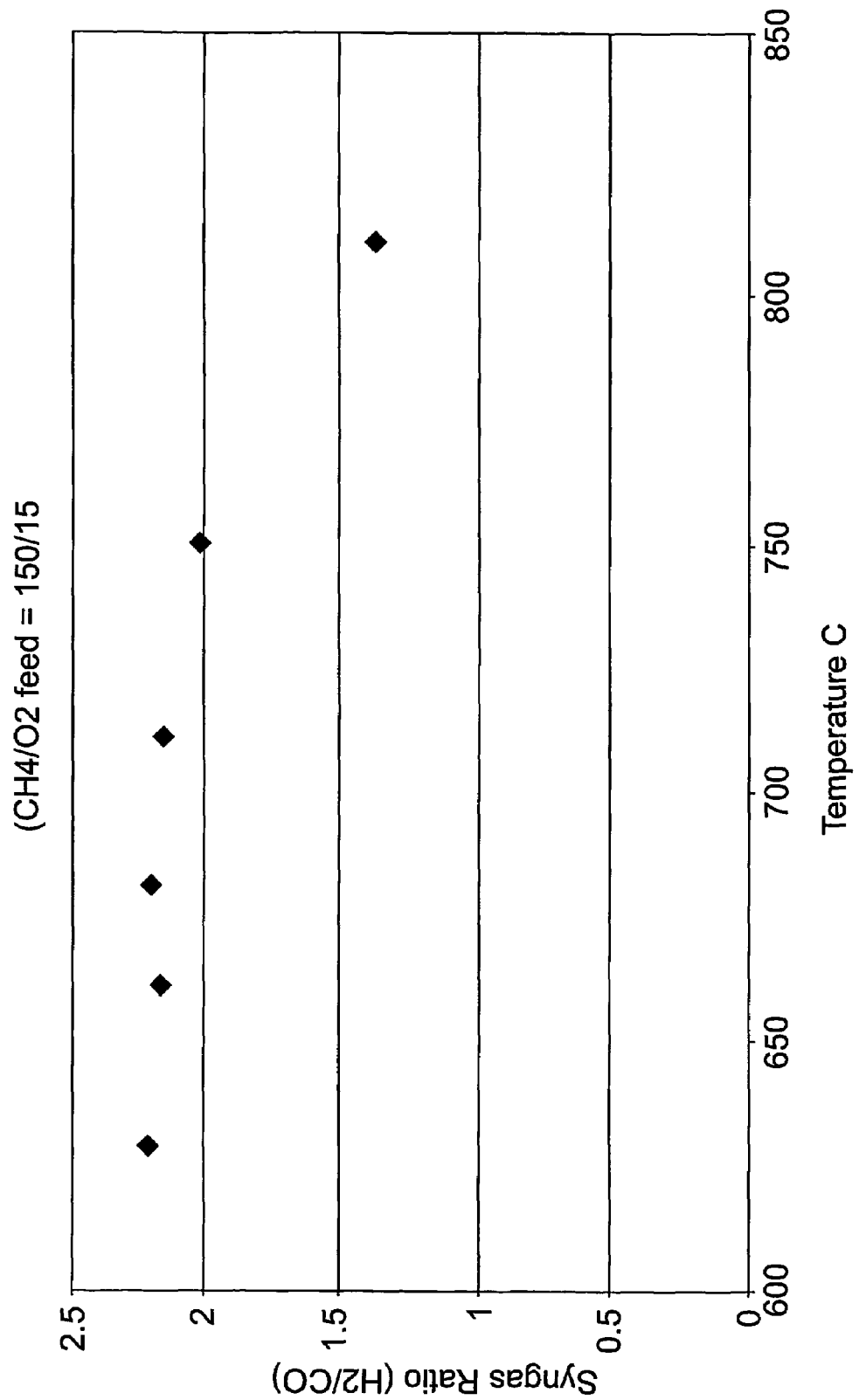
FIG. 4 is a temperature/syngas ratio plot showing the optimal temperature required to achieve the desired syngas ratio.
Figure 5:
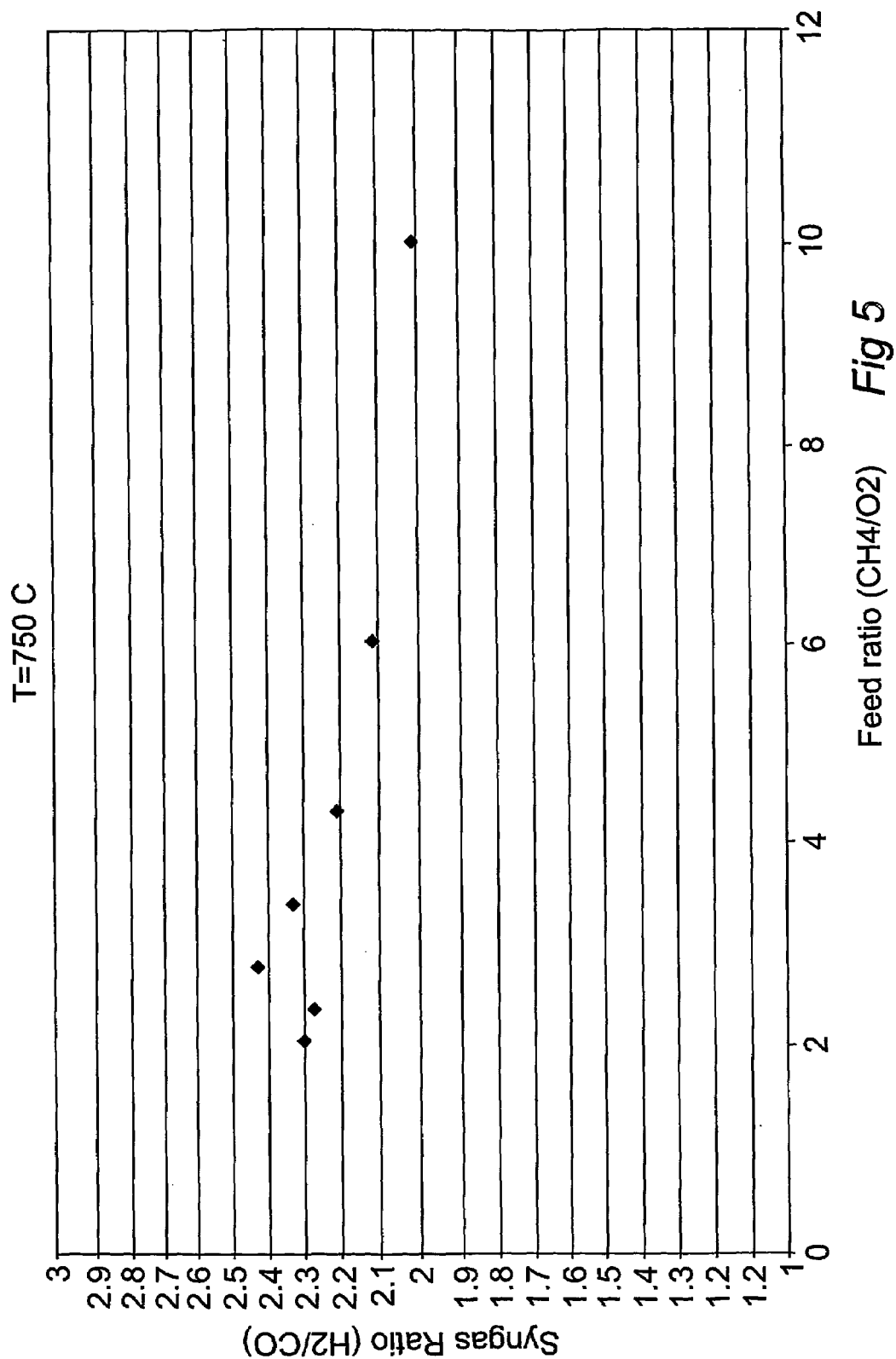
FIG. 5 is a feed ratio/syngas ratio plot showing the optimal feed ratio required to achieve the desired syngas ratio.
Figure 6:
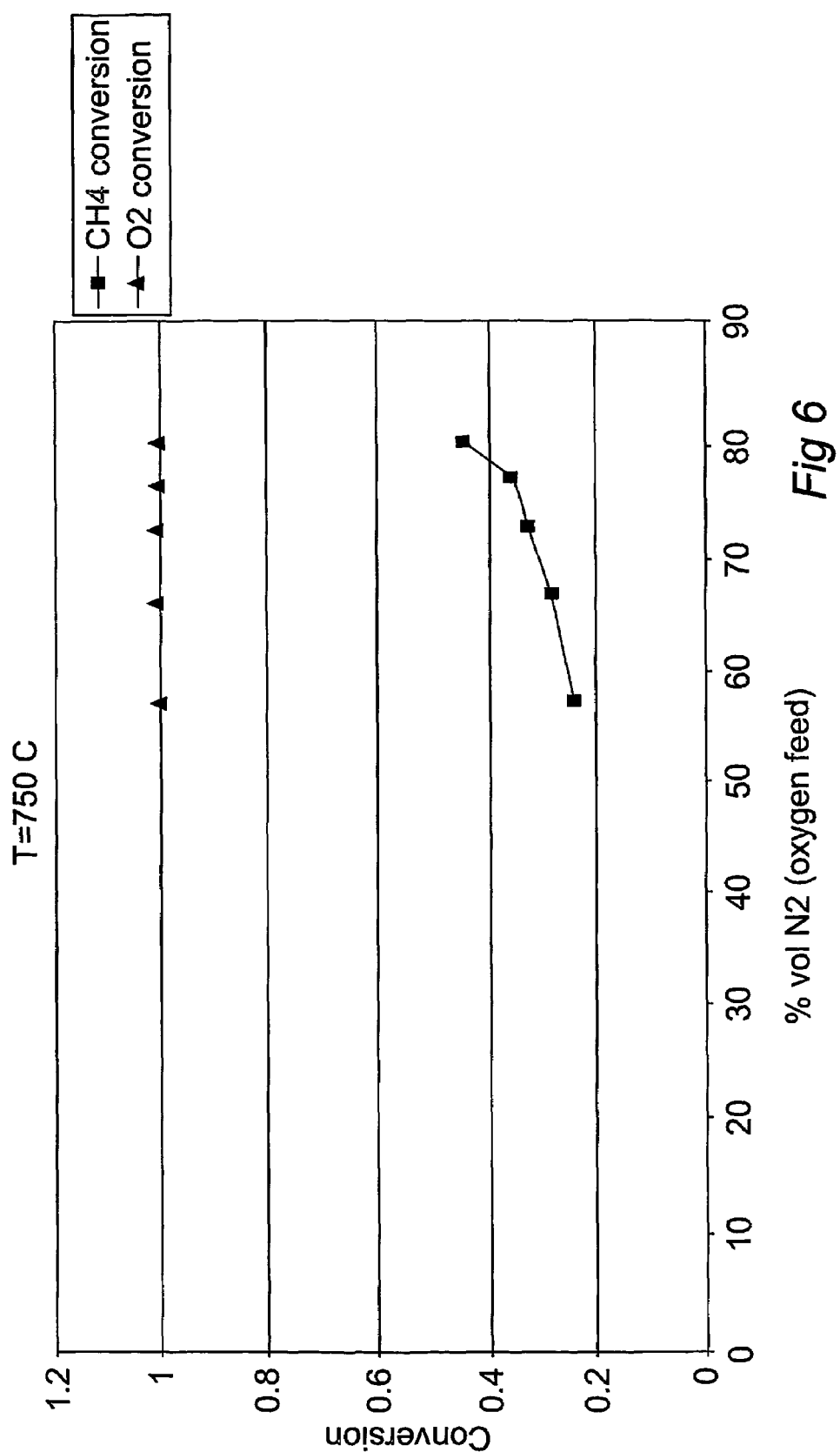
FIG. 6 is a % Vol. $N_2$/Conversion plot showing conversion of $CH_4$ and $O_2$ at 750° C.
Figure 7:
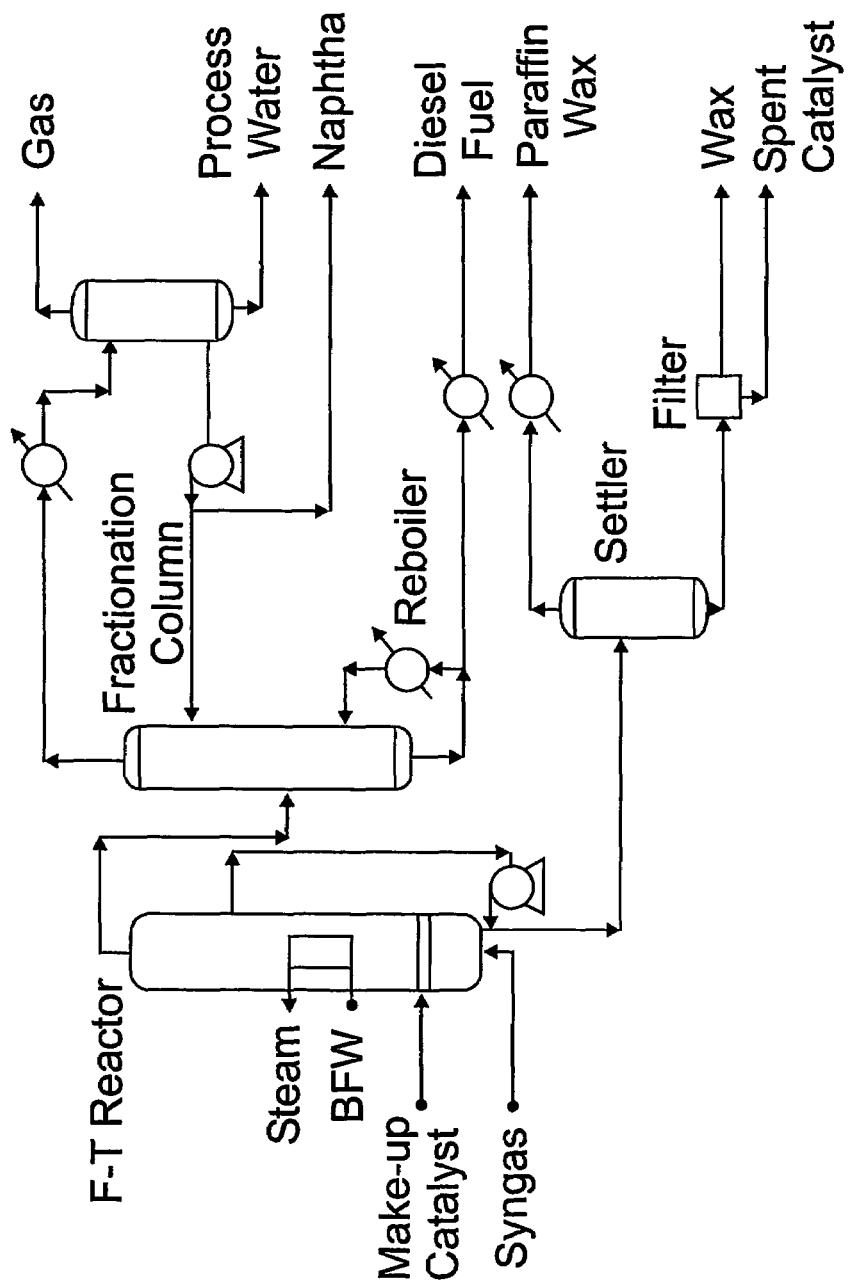
FIG. 7 is a schematic flow diagram providing background information relating to Fischer-Tropsch Gas-to-Liquids Technology.

Other aspects investigated in testing the membrane 10 include the effect of operating temperature (FIG. 4), methane flow rate (FIG. 5) and composition of syngas yield and selectivity (FIGS. 4 and 6).

FIGS. 9-18 show a variety of these results using such an apparatus. In each case, values of oxygen and methane conversions and the yields of hydrogen and carbon monoxide are monitored.

To investigate the initial reaction products of the $CH_4/O_2$ feed, experiments were carried out at low methane conversion rates and the products were analysed as detailed above.

The oxygen feed flow rate was held constant at 75 ml/min and the methane feed flow rate was varied from 150 to 425 ml/min, giving a range of total feed flow rates from 225 to 500 ml/min. The higher total feed flow rate decreases the contact time of the reactants with the catalysts, thereby decreasing methane conversation.

In FIG. 8 it can be observed that for methane conversion above and below 15% the $CO_2$ yield increases significantly.

The CO yield by contrast, increases for conversions lower than 20% having a slight decrease at conversions around 16% increasing again thereafter. The average CO yield is the highest average yield of any one product. The water yield follows the same profile as that for CO, but for methane conversions around 18% it decreases again, deviating from the CO yield. The average water yield is the lowest average yield of any one product. The hydrogen yield is a mirror image of the CO yield up to 16% methane conversion, rising considerably for higher conversion rates.

Figure 9:
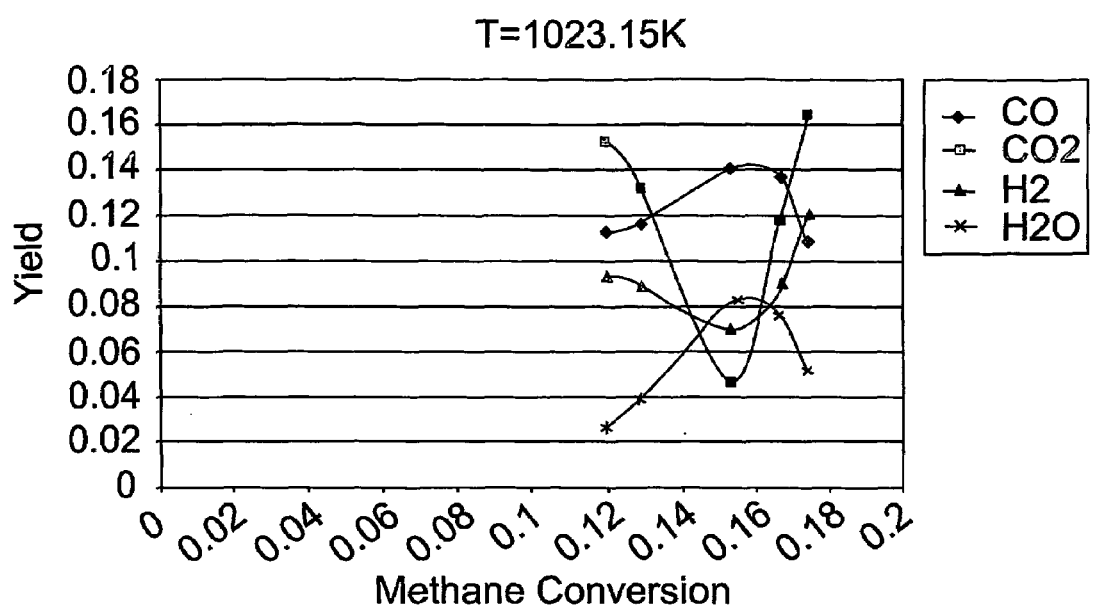
FIG. 9 is a graph showing the yield of reaction products at low methane conversation rates for a membrane apparatus in accordance with the present invention.
Figure 10:
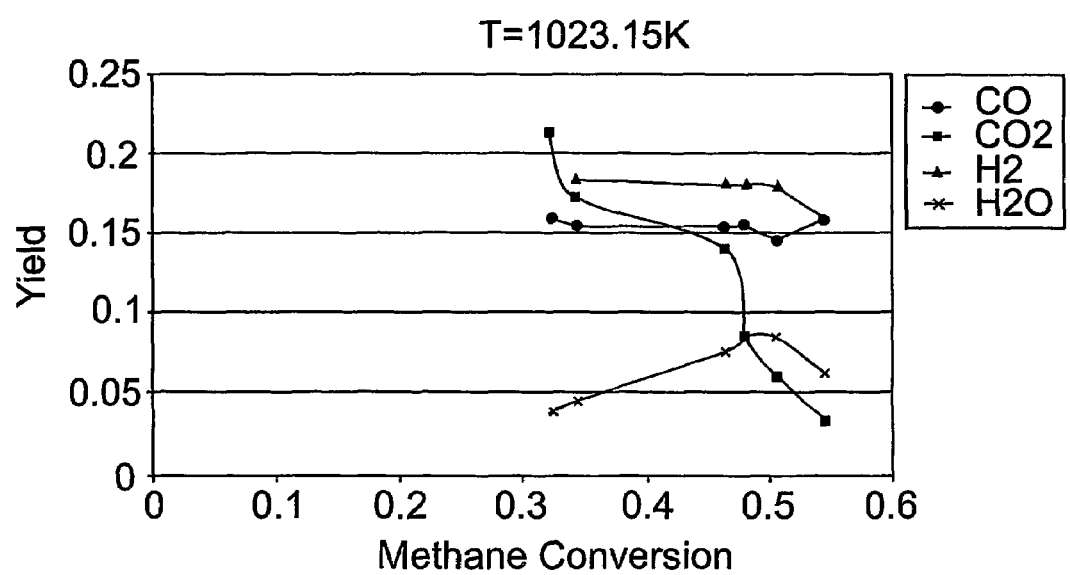
FIG. 10 is a graph showing the yield of various reaction products at high methane conversion rates by varying the feed ratio at a fixed temperature.
Figure 11:
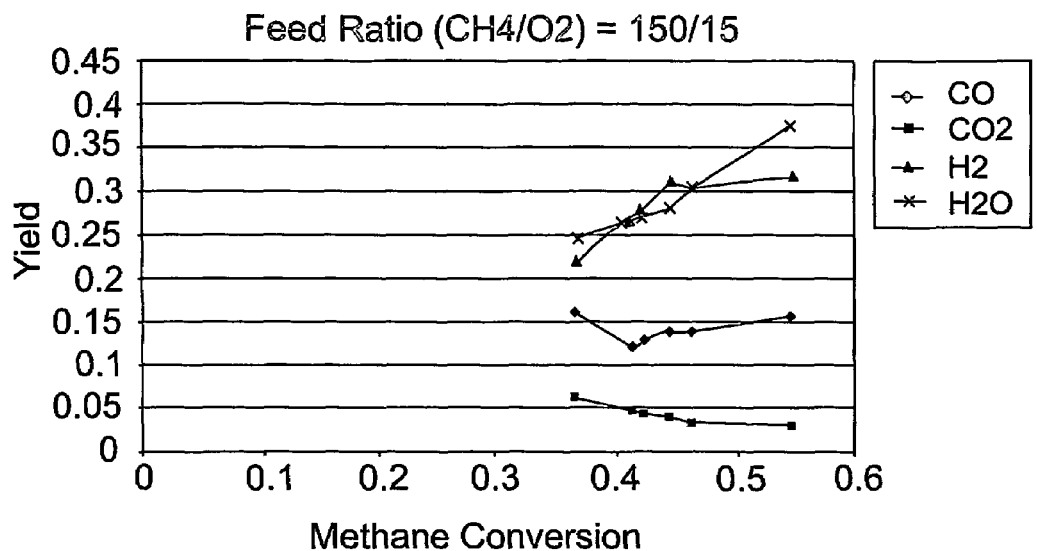
FIG. 11 is a graph showing the yield of various reaction products by varying the temperature at a fixed feed ratio.

In a second experiment, the feed flow rate of oxygen was varied from 15-75 ml/min whilst the flow rate of the methane was held constant at 150 ml/min giving reactions with total flow rates from 165-225 ml/min, as shown in FIG. 9. The temperature was 1023.15K. The methane conversion decreases proportionally with the increase in total flow rate, i.e. with the decrease in contact time.

With higher methane conversions rates, allowing more contact time, the $CO_2$ yield continues to increase up to 30% methane conversion, falling slightly around 15% yield and significantly when methane conversions reach around 50%. When methane conversion is over 55%, an insignificant yield of 5% $CO_2$ is found. Thus the lowest yield of $CO_2$ is found for methane conversion higher than 50%.

The CO yield stabilises at around 15% for methane conversions higher than 20%. Water yield stabilises at 5% for methane conversion from 20% up to around 40% increasing to almost 10% water yield at around 50% methane conversion, falling again to around 5% yield at 55% methane conversion. Hydrogen yield rises to around 18% hydrogen for methane conversions from 30% up to 50% declining to 0.16 yield for higher methane conversions.

Thus the contact time (controlled by the feed rate) does not have a significant influence on the resulting products, but does influence the methane conversion rate. An advantage of certain embodiments of the present invention is that they can be used with low and high flow rates (producing corresponding high and low contact times) without affecting the resulting products. Longer contact times aid methane conversion and provides high yields of hydrogen and carbon monoxide and low yields of water and carbon dioxide with methane conversion is at about 50%.

To obtain this contact time the total feed flow rate needs to be lower than 185 ml/min for this load of catalyst and temperature of 1023.15K. Other embodiments of the invention can use different feed flow rates.

It is well recognised that the partial oxidation of methane may occur via two distinct mechanisms, i.e., direct partial oxidation or total oxidation followed by reforming reactions [3]. In order to elucidate the mechanism for the catalytic membrane reactor used here, the effect of the temperature on the methane conversion and product yields was studied. The results of the analysis are presented in FIGS. 4 and 8a.

Figure 8A:
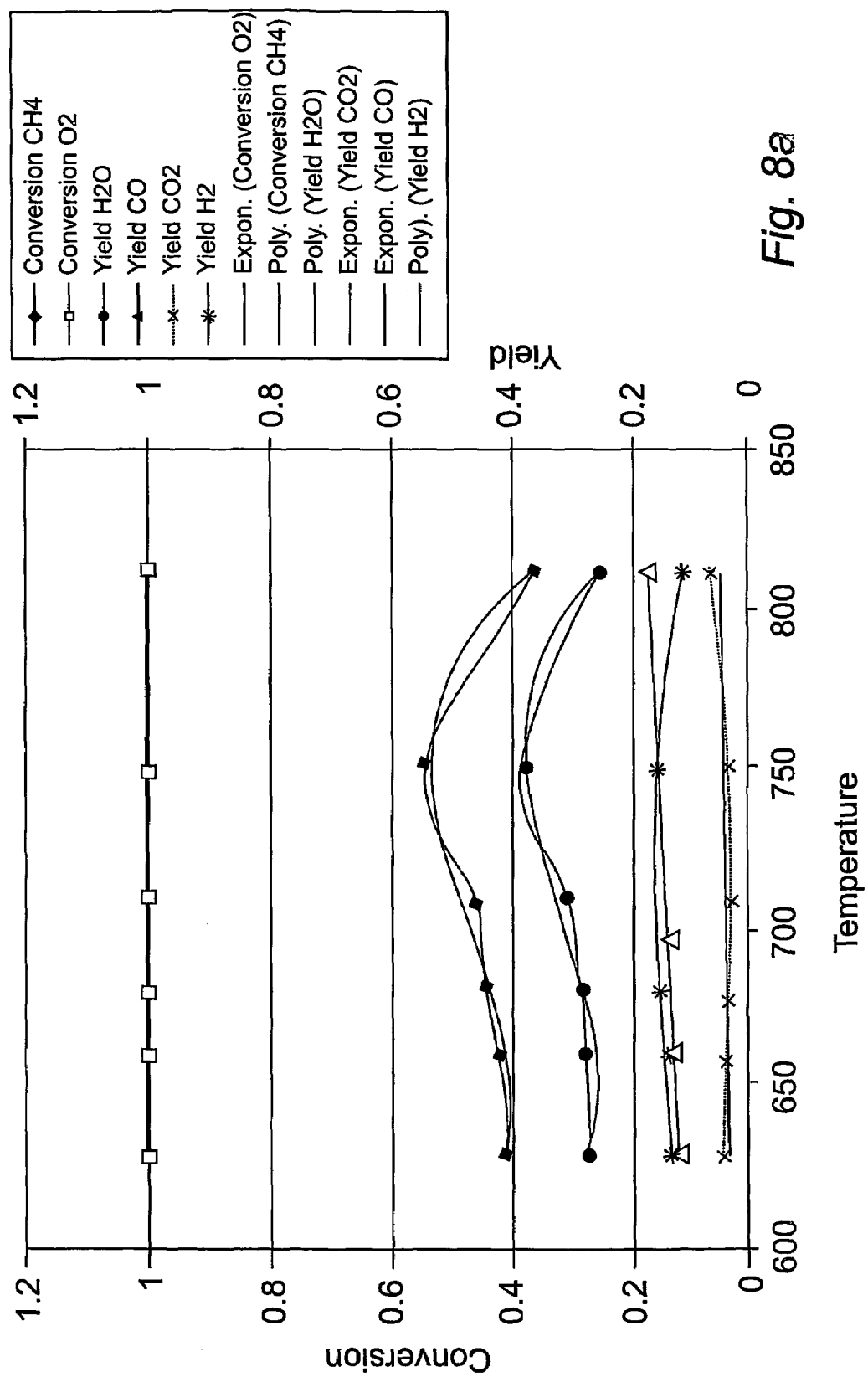
FIG. 8a is a graph showing the effect of temperature on the methane conversion rate.

FIG. 8a shows the influence of temperature on methane conversion and products yields for a total feed flow rate of 165 ml/min (150 ml/min of methane and 15 ml/min of oxygen). FIG. 8a shows that all the oxygen is consumed. This occurs before significant amounts of hydrogen and carbon monoxide are formed. Another important feature is that the conversion of methane, yield of water and yield of hydrogen all pass through a maximum at 750° C. This behaviour suggests that below 750° C., water, carbon monoxide and hydrogen are primary products while carbon dioxide is a parallel side reaction as depicted in scheme 1.

Scheme 1

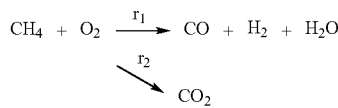

Kinetic modelling has shown that the overall reaction can be described well with the contribution of parallel oxidation and full oxidation according to scheme 1.

Above 750° C., the total oxidation reaction $r_2$ is expected to dominate with a significant increase in water and carbon dioxide. However, examination of FIG. 8a shows that the carbon dioxide yield shows only a modest increase above 750° C., while the yields for water and hydrogen fall above this temperature. This suggests that hydrogen, carbon dioxide and water are being consumed accordingly to scheme 2 below.

Scheme 2

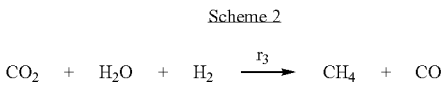

Scheme 2 helps explain the fall in the water and hydrogen yields, the modest $CO_2$ yield increase and the fall in methane conversion above 750° C.

One important aspect in the subsequent conversion of synthesis gas to liquids via a Fischer-Tropsch type reaction is the hydrogen: carbon monoxide ratio. A ratio of 2/1 is optimum for this conversion. From examination of FIG. 4 it can be seen that an optimal temperature of around 750° C. results in the desired syngas (H2/CO) ratio of 2.

The optimal feed ratio of methane to oxygen is shown, in FIG. 5, to be 10, although reasonable results which are relatively close to the desired ratio of 2 are obtained at feed ratios of between 2 and 6 also.

FIG. 4 shows a plot of the $H_2/CO$ over the temperature range studied. The optimum for gas-to-liquids conversion is obtained at a temperature of 750° C. Above this temperature, a ratio below 2.0 is attained while below 750° C., a value above 2.0 is obtained.

Selectivity is defined as the yield of a particular component in proportion to the amount of methane conversion, that is $$Selectivity_X = Yield_X / Conversion_{CH4}$$

Figure 12:
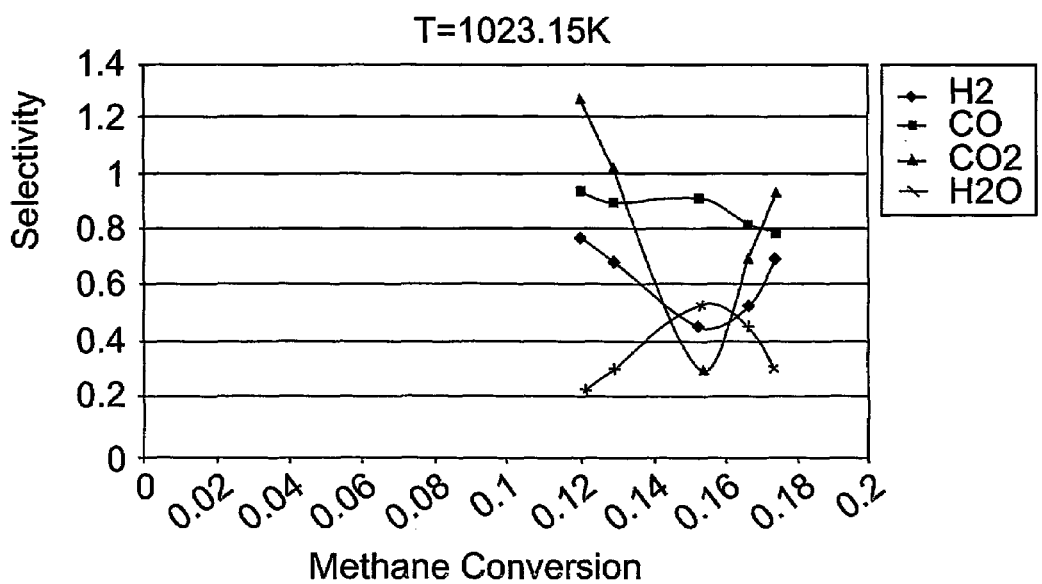
FIG. 12 is a graph showing the selectivity of various reaction products at low methane conversions.
Figure 13:
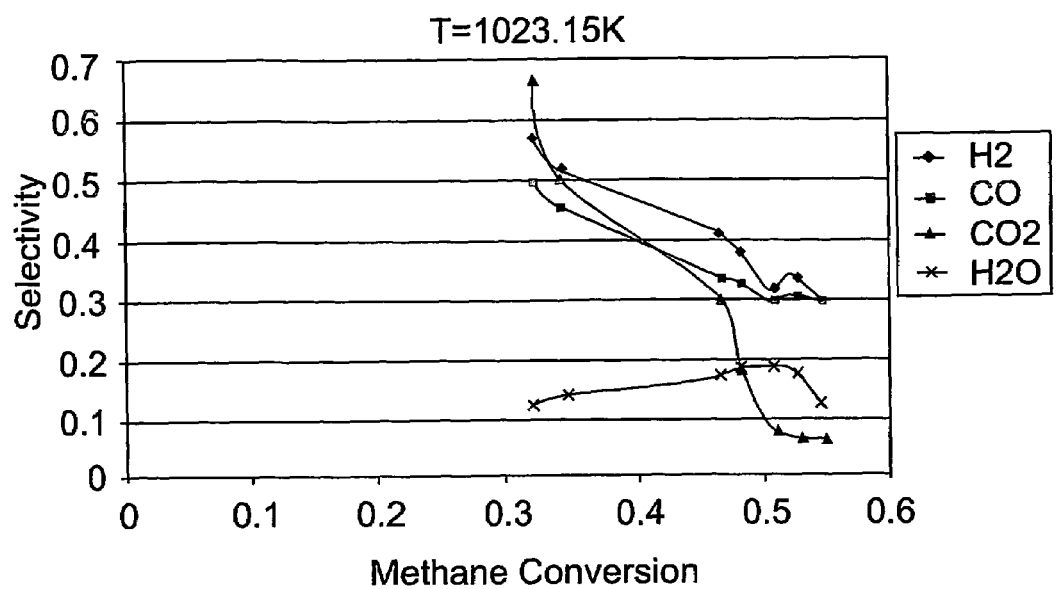
FIG. 13 is a graph showing the selectivity of various reaction products by varying the feed ratio at a fixed temperature.

Selectivity for low and high methane conversion rates is shown in FIGS. 12 and 13. There the CO selectivity remains almost constant with values around 0.9. This possibly indicates the absence of secondary reactions for CO in low methane conversions. Hydrogen selectivity decreases for methane conversion up to 15% and increases thereafter, reaching similar CO selectivity values.

Water selectivity profile follows a mirror image of hydrogen selectivity, increasing for conversions up to 15%, decreasing for higher conversions. For higher values of methane conversion water selectivity is constant, indicating the absence of secondary reactions for water formation.

Hydrogen selectivity decreases significantly for methane conversions up to 50%, increasing slightly after that.

The selectivity of Co decreases to lower values than $H_2$ selectivity for methane conversions up to 45% becoming stable thereafter, indicating that for methane conversions higher than 46%, CO is not formed by any secondary reaction.

$CO_2$ selectivity decreases with the increase of methane conversion, being the least selective gas formed in this reaction.

Figure 14:
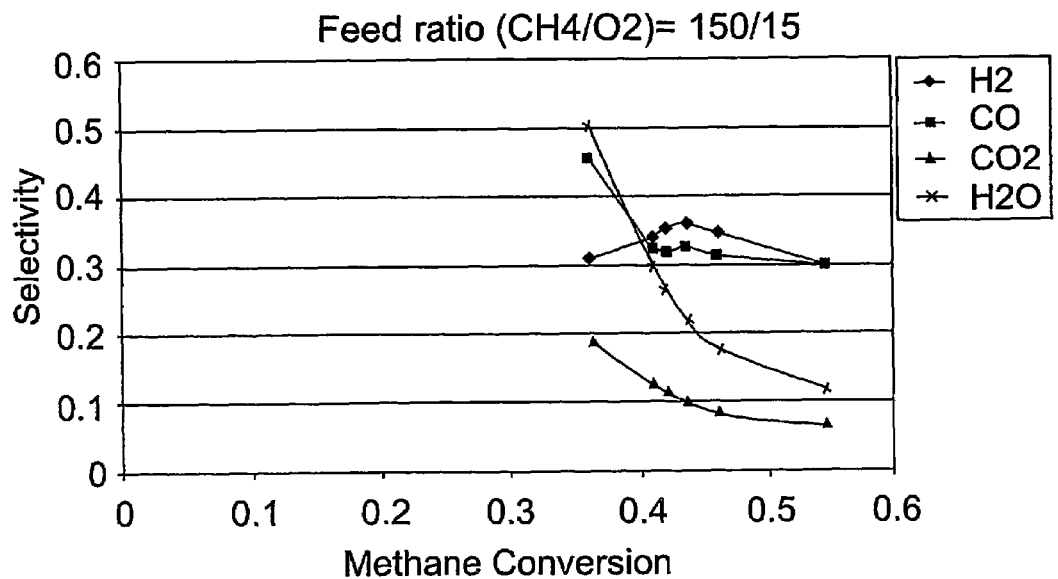
FIG. 14 is a graph showing the selectivity of various reaction products by varying the temperature at a fixed feed ratio.

It is important to note that the above-mentioned experimental data were taken with varying contact time, which can influence on the selectivity values. For constant contact time, but varying temperature, values are shown in FIG. 14.

Effect of Feed Composition Variation on Reactor Performance

Figure 15:
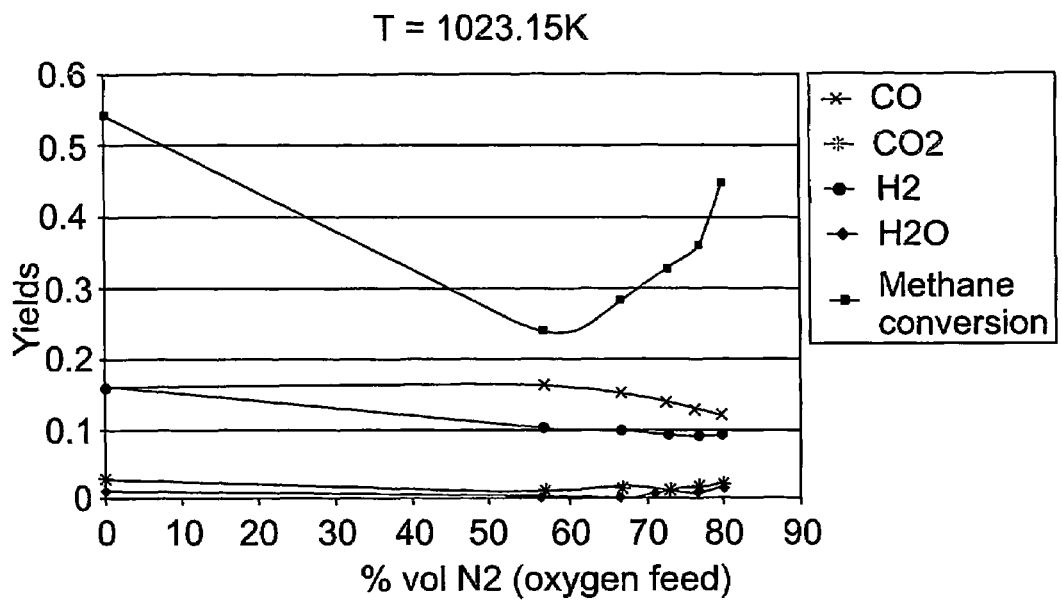
FIG. 15 is a graph showing the yield of various reaction products against the proportion of nitrogen in a nitrogen/oxygen feed.
Figure 16:
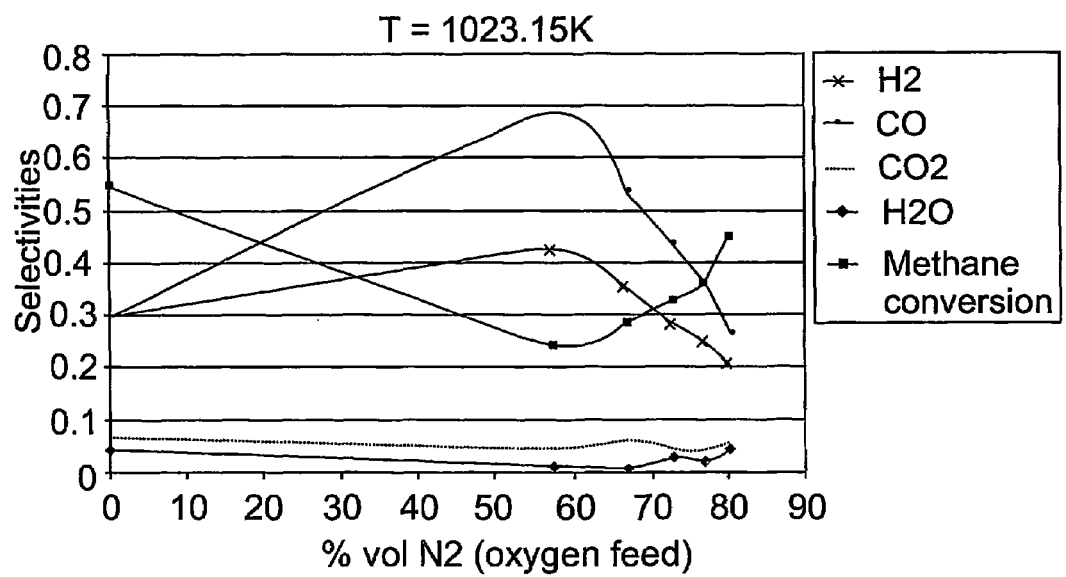
FIG. 16 is a graph showing the selectivity of various reaction products against the percentage of nitrogen in the nitrogen/oxygen feed.

FIGS. 15 and 16 show the yield and selectivity when a varying proportion of nitrogen is added to the oxygen feed. This influences the contact time of the reagents with the catalyst.

FIG. 15 shows that CO yield falls constantly with the addition of nitrogen in the system. Hydrogen yield decreases with up to 50% nitrogen in the oxygen feed and is constant thereafter.

The selectivity of carbon dioxide and water as shown in the yield chart is not affected by the addition of nitrogen in the system. However carbon monoxide and hydrogen selectivities have a continuous drop after a pick up at around 50% vol. of nitrogen.

The water and $CO_2$ yields values do not differ significantly when nitrogen is present or absent although there is a small rise for air composition (80% $N_2$)

FIG. 6 also shows that even for an 80% vol $N_2$ feed (and hence 20% $O_2$ feed) total oxygen conversion takes place at a temperature of 750° C. The results show that embodiments of the present invention can work by using an air feed rather than a pure oxygen feed thereby negating the need for an oxygen separation plant for this reaction to take place. This clearly reduces both the initial outlays and operating costs of performing the reaction. Thus a benefit of certain embodiments of the invention is that air separation is not required to produce the syngas of optimal ratio for onward reaction to liquid hydrocarbons via a Fischer-Tropsch reaction.

Figure 17:
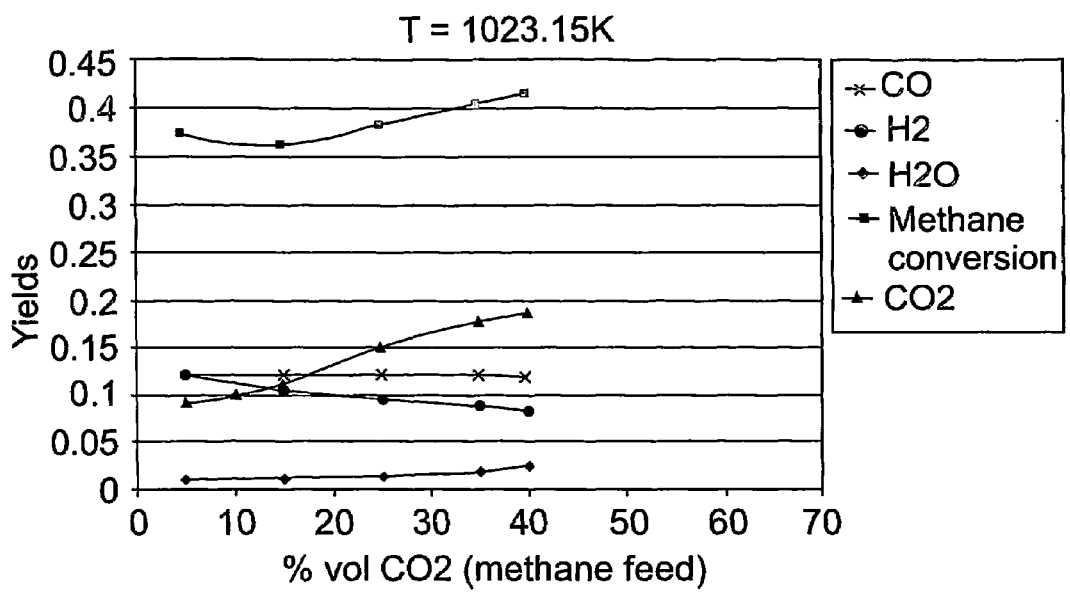
FIG. 17 is a graph showing the yield of various reaction products against the percentage of carbon dioxide in the methane feed; and, FIG. 18 is a graph showing the selectivity of various reaction products against the percentage of carbon dioxide in the methane feed.
Figure 18:
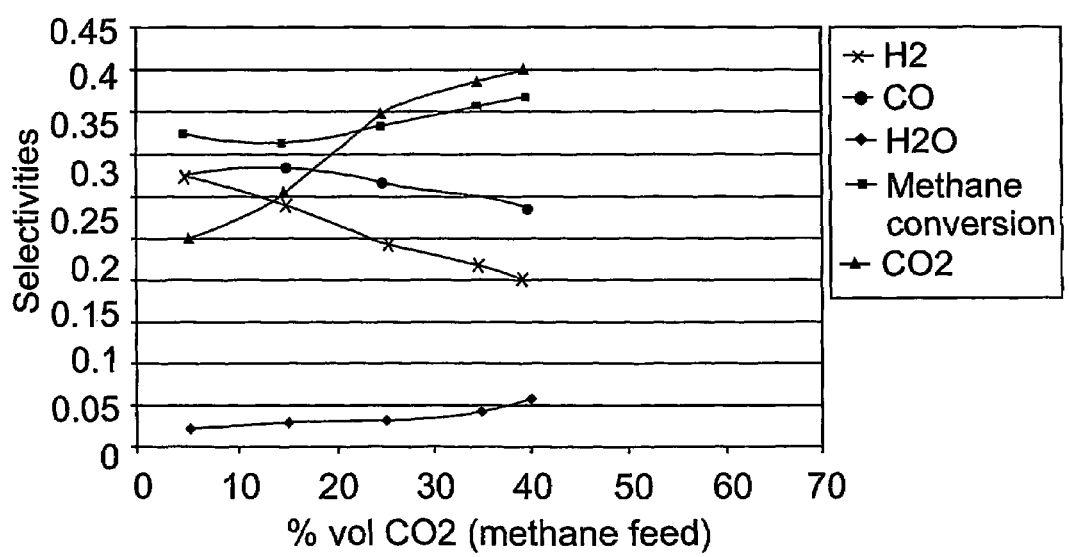

In contrast to the nitrogen, the addition of $CO_2$ in the feed does not influence CO yield, but reduces hydrogen yield whilst increasing $H_2O$ yield. The results are shown in FIGS. 17 and 18.

The selectivity of CO and $H_2$ decreases slightly in higher proportion for hydrogen with the addition of $CO_2$ in the methane feed.

The water selectivity is generally constant but does increase slightly for higher amounts of $CO_2$ in the feed.

An advantage of certain embodiments of the invention is that the oxygen and methane are fed separately into the apparatus and so there is no danger of an explosion. The oxygen proceeds through the modified membrane 10, is activated and then reacts when it comes into contact with the methane. Thus it is possible to lower the ratio of methane and oxygen in the feed to a ratio more suitable for their reaction. Such a ratio would normally be considered potentially explosive, but certain embodiments of the present invention allow for such ratios without the potential for an explosion partly because of the separate oxygen/methane feed.

Embodiments of the present invention benefit from the highly dispersed catalyst which increase its surface area and efficacy of the apparatus.

Figure 8B:
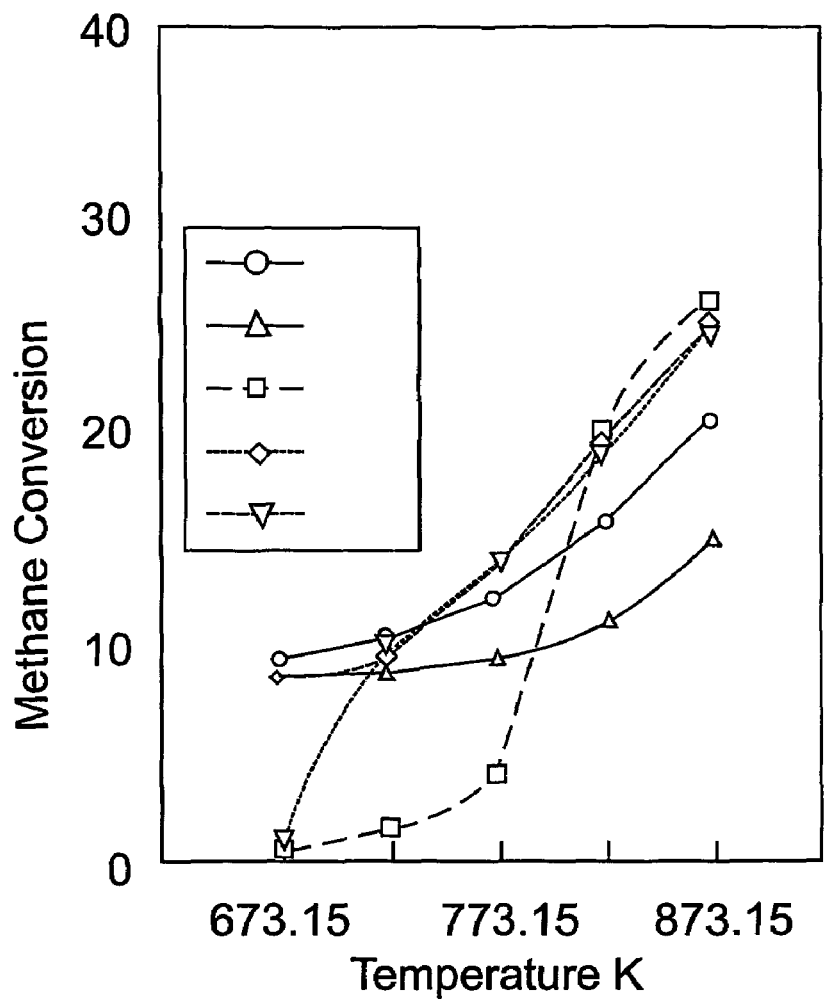
FIG. 8b is a graph showing the effect of reaction temperature on the conversion rate of methane for fixed-bed and membrane reactors.

Embodiments of the present invention benefit from the high conversion rate of oxygen. To illustrate the benefits of membrane reactor operation in syngas production, FIG. 8b shows the effect of reaction temperature on the conversion of methane over Ir-loaded catalyst carried out with fixed-bed flow type quartz reactor (350-10 mm) at atmospheric pressure, using 60 mg of catalyst, 25 ml/min of $O_2$ and temperature range of 673-873K. At 873K the performance of Ir and Rh are roughly identical [4].

In the same figure, experimental data is shown for a membrane system in accordance with the present invention at 900.15K. The conversion values obtained using a fixed-bed flow reactor are significantly lower than those obtained in the membrane reactor due to equilibrium limitation. This has been overcome in the membrane reactor which achieves 100% conversion of oxygen and a methane conversion of 41%.

Since, in the modified membrane 10, the catalysts 12 are highly dispersed, lower reaction temperatures are feasible thereby reducing the propensity for coke formation and subsequent deactivation of the catalysts 12. The absence of coke formation optimises catalyst usage whilst maintaining high syngas selectivity. In the operation of the membrane apparatus 8, additional catalysts (not shown) may be inserted into the inner bore of the modified membrane 10 as necessary to further enhance the reaction. These additional catalysts (not shown) are obtained by physically breaking another sample of a modified membrane 10 into appropriate particle sizes and inserting the particle sizes into the test or operation sample.

Certain embodiments of the present invention benefit from being used to generate hydrogen from, for example, methane. The hydrogen can be used as a fuel itself rather than converted into larger hydrocarbons via a Fischer-Tropsch reaction.

Certain embodiments of the invention benefit from the fact that the partial oxidation method is exothermic and therefore reduces energy consumption.

Certain embodiments of the invention benefit from the fact that the process has a fast start-up.

In contrast, steam reforming to produce syngas has a large endothermic reaction and a slow start-up time. Thus certain embodiments of the invention provide a catalytic membrane reactor which has been developed and used to produce hydrogen, particularly synthesis gas, under various operating conditions with total consumption of oxygen. At lower feed ratios ($CH_4/O_2$), the syngas ratio is well above 2.0 while at higher $CH_4/O_2$ ratio, the syngas ratio is 2.0. Thus depending on the application the reactor is flexible to the extent that it could be applied in the Fischer-Tropsch process for converting natural gas to liquid hydrocarbons. For gas-to-liquids conversion, an optimum temperature of 750° C. has been established at which the hydrogen/carbon monoxide ratio is 2.0.

Modifications and improvements may be made to the foregoing without departing from the scope of the present invention. For example;

Though the apparatus and method described relates to the production of syngas from the reaction between methane and oxygen, a similar method and apparatus could be used in the reaction of any light hydrocarbon such as members of the alkane or alkene group. Furthermore, the process and apparatus could be used in any reaction where there are two reactants which have constraints that make it undesirable to mix them before the reaction has taken place, such as flammability constraints.

It will be understood that the flux of oxygen could be reversed by feeding the oxygen into the bore of the modified membrane 10, and the methane into the outer bore 22. However, in this case this arrangement would be less desirable since the methane may have impurities in it, such as $H_2S$, which would poison the catalyst 12. Therefore passing the oxygen through the modified membrane 10 is preferred.

REFERENCES

1. Gobina, E., *The World Natural Gas Business*, BCC, Inc., 2000.
2. Gobina, E., *Hydrogen as a Chemical Constituent and as an Energy Source*, BCC, Inc. 2002.
3. Prettre, M., C. Eichner, and M. Perrin, Trans. Faraday Society, 1946. 43: p. 335.
4. Nakagawa, K., et al., *Partial Oxidation of Methane to Synthesis Gas with Iridium-loaded Titania Catalyst*. Chemistry Letters, 1996: p. 1029-1030.

The invention claimed is:

1. A method of producing hydrogen gas, the method comprising:
   providing a membrane, the membrane comprising a support and a catalyst;

passing a first reactant through the membrane from a first chamber to a second chamber containing a second reactant;

allowing the first reactant to come into contact with the catalyst upon passage through said membrane;

imparting the first reactant with enough energy so as to react with the second reactant, wherein the energy imparted on the first reactant activates molecules of the first reactant without forming an ionic species before reaction with the second reactant;

reacting the first reactant with a second reactant to produce hydrogen gas without forming an ionic species before reaction with the second reactant.

2. The method as claimed in claim 1, wherein the method is conducted at a temperature over 500° C.

3. The method as claimed in claim 2, wherein the temperature is between 700° C. and 800° C.

4. The method as claimed in claim 1, wherein the first reactant is one of oxygen and a hydrocarbon, and the second reactant is the other of oxygen and a hydrocarbon.

5. The method as claimed in claim 4, wherein the oxygen and hydrocarbon do not come into contact with each other until the first reactant has passed through said membrane from the first chamber to the second chamber.

6. The method as claimed in claim 4, wherein the hydrocarbon comprises a normally gaseous hydrocarbon.

7. The method as claimed in claim 3, wherein the pressure within the first chamber is greater than the pressure within the second chamber.

8. The method as claimed in claim 3, wherein carbon monoxide is formed in addition to the hydrogen.

9. The method as claimed in claim 8, wherein the carbon monoxide and hydrogen are further reacted to produce normally liquid hydrocarbons in a Fischer-Tropsch type reaction.

10. The method as claimed in claim 3, wherein the hydrogen is recovered for use as a fuel.

* * * * *

UNITED STATES PATENT AND TRADEMARK OFFICE
CERTIFICATE OF CORRECTION

PATENT NO. : 7,641,888 B2
APPLICATION NO. : 10/555000
DATED : January 5, 2010
INVENTOR(S) : Edward Gobina and Susanne Olsen It is certified that error appears in the above-identified patent and that said Letters Patent is hereby corrected as shown below:

Title page

Item (73) Assignee: reads "Gas2 Limited, Aberdeen (GB)" should be --The Robert Gordon University, Aberdeen (GB)--

Signed and Sealed this

Twentieth Day of July, 2010

David J. Kappos
*Director of the United States Patent and Trademark Office*